Patented Feb. 4, 1930

1,746,070

UNITED STATES PATENT OFFICE

PETER C. CHRISTENSEN, OF EAST ORANGE, NEW JERSEY

THERMOPLASTIC MATERIAL AND METHOD OF PRODUCING THE SAME

No Drawing.   Application filed August 20, 1926.  Serial No. 130,560.

My invention relates to a new and improved material which is somewhat thermoplastic and which is somewhat similar in its nature to the solid casein product known as synthetic horn and also by the trade names "galalith" and "eronoid".

The invention resides in a material of this character capable of being used for all the purposes for which synthetic horn is adapted to be used, such for example as in the manufacture of beads, combs, cigar and cigarette holders, playing blocks, fountain pens, pencils, buttons, novelties and numerous other articles, but which is superior in quality to synthetic horn and much cheaper to produce. My invention also resides in a new, improved and simple method of producing this material.

I have found that a material having the characteristics noted above, may be obtained by properly combining the substance known as "leather gum", with casein and properly treating the resulting product.

The substance known as "leather gum" is produced as follows: leather, and preferably a mass of scrap leather because of its cheapness, is first immersed at ordinary room temperature in a dilute solution of a suitable acid such as sulphuric acid for the purpose of removing therefrom the oils, fats, glucose, glycerines and similar substances. Sulphuric acid solutions of various strengths may be used, it being preferable, however, to use a very weak solution such for example as anywhere from a ½% to a 2% solution. The leather is subjected to this treatment for a period of about 6 hours to 24 hours, this largely depending upon the strength of the sulphuric acid solution employed. The practically disintegrated leather or leather-like substance resulting from such treatment is then boiled in water in an open vessel for a period of from about ½ hour to 3 hours, during which such substance, then consisting almost entirely of coherent fibrous materials freed from substantially all oils, fats, glucose, glycerine and similar substances which were present in the leather, is disintegrated and comminuted and settles in the form of a heavy brown gum. This gum is then preferably removed from the water and allowed to cool, whereupon it becomes a hard mass somewhat similar in appearance to rosin. The hardened gum which is the "leather gum" referred to, is then ground to a granular or powdered form.

In producing my improved material I mix any desired proportions of "leather gum", preferably, although not necessarily, in the powdered or granular form, and casein, also preferably in powdered form. While good results may be obtained by the use of various proportions of "leather gum" and casein, I find that the best results are obtained by the use of substantially equal proportions by weight of these materials. In mixing the "leather gum" and casein, sufficient water is added to produce a thick moist mass of powdered material, the best results being obtained by adding an amount of water which is from about 25% to 50% of the weight of the "leather gum" and casein. This operation is preferably carried out in a mechanical mixer at ordinary room temperature and is continued until the materials become thoroughly mixed.

The thick moist mass of "leather gum" and casein is then preferably fed between heated masticating rolls for the purpose of obtaining a better and more uniform mixture of the materials. The masticating rolls are preferably maintained at a temperature of from about 130° to about 212° F. In this operation the material adheres to the surface of the masticating rolls from which it is removed by scraping.

After the material has been passed through the masticating rolls, as described above, it may be made either into rods or tubes, as by employing extruding machines similar to those used in forming rods or tubes of hard rubber or celluloid, or it may be molded into any desired form in suitable moulds.

Where the material is molded, I preferably introduce the same into rectangular moulds for the purpose of producing the material in the form of flat sheets or slabs. The molding operation is performed under heat and pressure suitable for producing compact and uniform sheets or slabs of the material, best results being attained by maintaining the moulds heated at a temperature of from about 130° to about 212° F., and by employing a molding pressure of from about 100 to 200 pounds per square inch. The material may also be molded into large blocks from which slabs of any desired thickness may be sliced, as is customary in the case of hard rubber.

Rods, tubes, sheets, etc., formed of the mixture of "leather gum" and casein, in the manner described above, become very hard upon cooling, substantially as hard as natural horn, but are quite brittle and if not further treated will crack and crumble upon exposure to the atmosphere. Accordingly the material is now treated so as to render the same very tough and non-brittle, preferably by properly curing the same. This is preferably accomplished by immersing the material in a solution of an aldehyde, and preferably a solution of formaldehyde, maintained at ordinary room temperature. The material is permitted to remain in the solution of formaldehyde until the same becomes thoroughly cured, the period necessary for this largely depending upon the strength of the formaldehyde solution employed and the thickness of the material being treated.

The material produced and treated as described above may be turned and machined into numerous forms of finished articles, such as those heretofore mentioned. The material is also sufficiently thermo-plastic so that it may be readily molded under heat into articles of various forms; the thermo-plasticity of the material being somewhat comparable to that of hard rubber. This improved material has all the desirable characteristics of synthetic horn or "galalith" and in many respects is superior in quality. It is a fine amorphous substance and very enduring, and it is considerably harder and will take a more brilliant polish than synthetic horn or "galalith", and is appreciably cheaper to manufacture than the latter.

The term "leather gum" is used in the claims to cover the gum produced by the removal of the oils, fats, glucose, glycerine and similar materials from leather by treatment with an acid solution and then disintegrating and comminuting the treated leather.

While I have specifically described the preferred form of my improved material and the preferred method of making the same, it is to be understood that both the material and the method are subject to various changes and modifications without departure from the spirit of the invention or the scope of the appended claims.

Having now described my invention, what I claim as new and desire to protect by Letters Patent is as follows:—

1. A hard amorphous material comprising a mixture in a comminuted state of only the fibrous materials which remain after subjecting leather to the action of an acid solution and casein.

2. A horn-like material formed from an intimate mixture in a comminuted state of only the fibrous materials which remain after subjecting leather to the action of an acid solution and powdered casein, said material being toughened by treatment with an aldehyde.

3. A material comprising a mixture of "leather gum" and casein.

4. A material comprising a mixture of substantially equal proportions of "leather gum" and casein.

5. A hard amorphous material comprising a mixture of "leather gum" and casein, said material being toughened by treatment with an aldehyde.

6. A hard amorphous material comprising a mixture of "leather-gum" and casein cured by treatment with formaldehyde.

7. A material comprising a mixture of casein and the fibrous substance which remains after removing from leather by treatment with an acid solution, the oils, fats, glucose and glycerine.

This specification signed this 18th day of August, 1926.

PETER C. CHRISTENSEN.